United States Patent [19]
Erdman

[11] 3,948,025
[45] Apr. 6, 1976

[54] IMPLEMENT DRAFT FRAME
[75] Inventor: Leon Paul Erdman, Beaver Dam, Wis.
[73] Assignee: Deere & Company, Moline, Ill.
[22] Filed: Apr. 16, 1975
[21] Appl. No.: 568,702

[52] U.S. Cl. .................. 56/10.1; 56/15.6; 172/273; 172/776; 280/150 F
[51] Int. Cl.² ......................................... A01D 35/12
[58] Field of Search ................... 172/776, 667, 273; 56/10.1, 10.2, 14.7, 14.9, 15.6, 15.8; 280/150 F

[56] References Cited
UNITED STATES PATENTS

| | | |
|---|---|---|
| 2,446,883 | 8/1948 | Pool et al. ......................... 56/15.6 X |
| 2,524,083 | 10/1950 | Ronning ............................ 56/15.6 |
| 2,622,383 | 12/1952 | Colvin ............................... 56/15.6 X |
| 2,924,928 | 2/1960 | Rhoades et al. .................. 56/15.8 X |
| 3,194,322 | 7/1965 | Hansen ............................ 172/677 X |
| 3,589,450 | 6/1971 | Price .................................. 172/273 |
| 3,608,285 | 9/1971 | Berk .................................. 56/10.2 |
| 3,796,028 | 3/1974 | Federspiel ...................... 172/273 X |

Primary Examiner—Paul E. Shapiro

[57] ABSTRACT

A lawn and garden tractor is provided with a pair of laterally spaced mounting brackets formed to define a pair of forwardly opening receptacles located at the underside of the tractor between front wheels of the latter. Connected between the brackets and a mower located beneath the tractor is a draft frame including a transverse rod having opposite end portions respectively received in the pair of receptacles and prevented from rotating therein by a pair of spring loaded pins projecting through respective pairs of aligned apertures located in the pair of brackets and in a pair of circular plates fixed to the rod. A lever is fixed to one end of the rod to rotate the latter so as to properly dispose the circular plate for the insertion of the pins during attachment of the mower. The draft frame also includes a pair of draft arms respectively pivotally connected between the pair of plates and the mower.

6 Claims, 4 Drawing Figures

IMPLEMENT DRAFT FRAME

BACKGROUND OF THE INVENTION

The present invention relates to a draft frame and more specifically relates to a draft frame for coupling an implement to a forward location of a lawn and garden tractor so as to be towed by the latter.

It is common to provide a lawn and garden tractor with some sort of mounting frame or bracket located at the forward end thereof and to couple implements to the frame by means of draft links or members. While much has been done to design these links or members such that they may be easily and quickly connected and disconnected, there still remains the problems that some draft link or member designs include various pieces which an operator must keep account of when not in use and must separately connect when in use and that some draft link or member designs include arrangements which are difficult to install because parts must be supported by hand while attempting to align mounting holes thereof with holes in the mounting frame or brackets.

SUMMARY OF THE INVENTION

According to the present invention, there is provided an improved draft frame and more specifically there is provided a draft frame for connecting an implement to a lawn and garden tractor.

A broad object of the invention is to provide a draft frame by which an implement may be easily and quickly connected to and disconnected from a towing vehicle.

Another object of the invention is to provide a draft frame which is normally assembled to form a unitary piece.

Still another object of the invention is to provide a draft frame constructed such that it may be supported by the hitch frame during the alignment of mounting holes of the draft frame with holes in the mounting frame.

These and other objects will become apparent from a reading of the following specification in conjunction with the appended drawings.

DESCRIPTION OF THE PREFERRED EMBODIMENT

Figure 1:
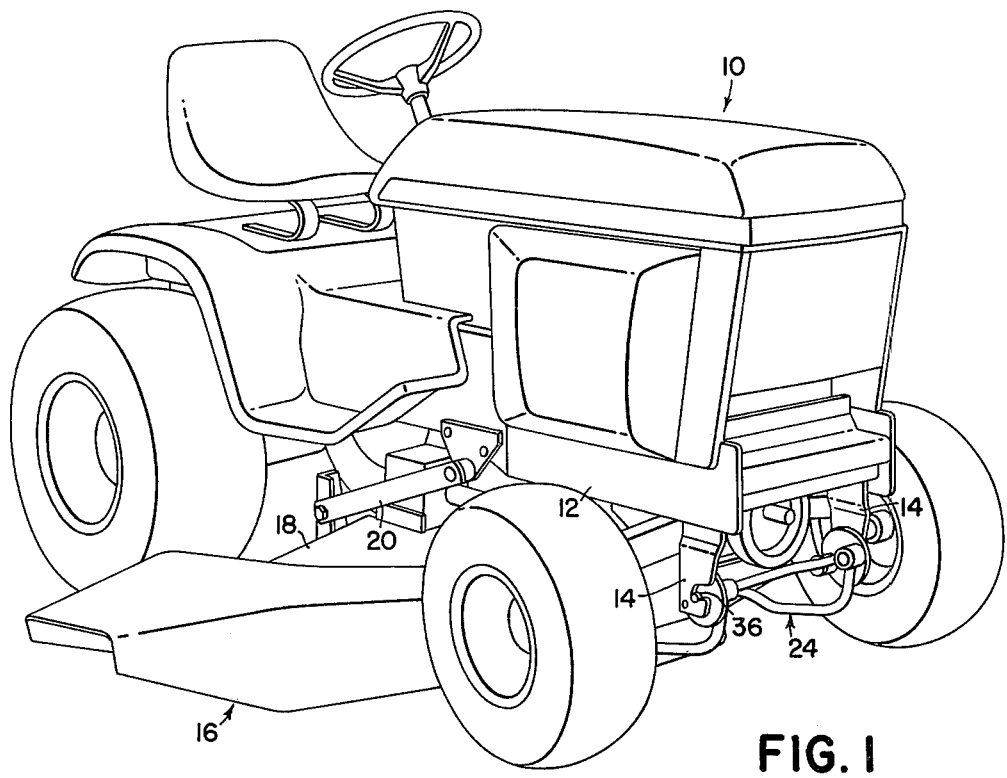
FIG. 1 is a right front perspective view of a tractor implement combination embodying a draft frame constructed according to the principles of the present invention.

Referring now to FIG. 1, therein is shown a tractor designated generally by the reference numeral 10. As illustrated, the tractor 10 includes a main frame 12 having a pair of plate-like brackets 14 fixed thereto in depending relationship at a forward location thereof. Suspended from the frame 12 is an implement 16, here shown as a mower having a deck or housing 18. The mower is attached to the tractor through means including a pair of rear draft links 20 (only the right link being shown) pivotally connected between structure provided at the rear of the deck 18 and the frame 12. Connected between a pair of spaced brackets 22, that are fixed to the front side of the deck 18, and the pair of brackets 14 is a draft frame 24 that constitutes the present invention.

Figure 2:
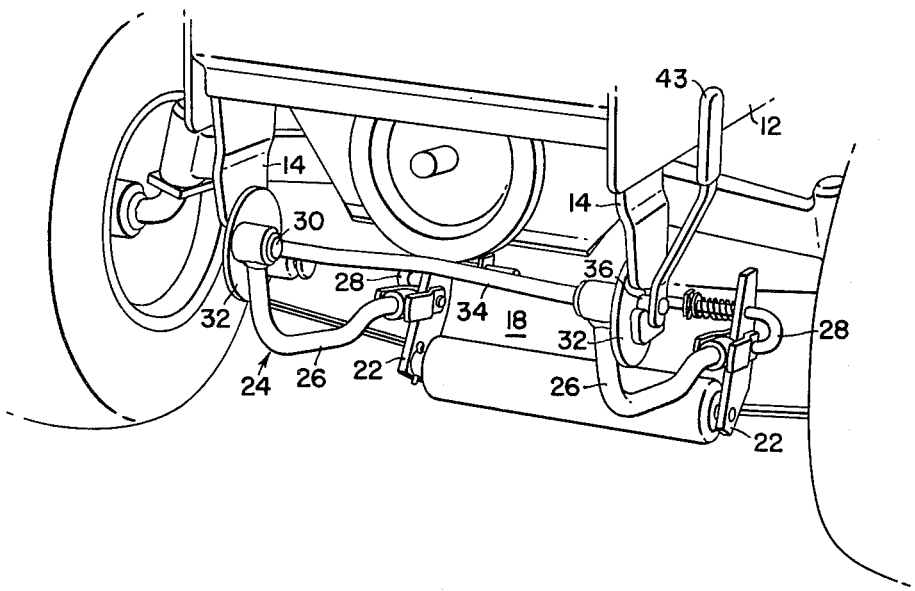
FIG. 2 is a perspective view showing the draft frame connected to mounting brackets at the front of the tractor.

The draft frame 24 includes a pair of laterally spaced draft links or arms 26 having their rear ends respectively pivotally connected to the pair of brackets 22 by means of a pair of spring loaded J-shaped pins 28 carried by the brackets 22, and having their front ends respectively pivotally carried on stub shafts 30 fixed to and projecting inwardly from a pair of circular plates 32. The plates 32 form part of a forward connection member of the frame 24, the connection member further including a transverse rod 34 having opposite end portions 36 respectively projecting centrally through and being fixed to the pair of plates 32. When the draft frame 24 is installed, as illustrated in FIGS. 1 and 2, the rod end portions 36 are respectively received in complimentary bearing portions of a pair of forwardly opening receptacles 38 respectively formed in the pair of plate-like brackets 14. The circular plates 32 are respectively embracingly engaged with inner surface portions of and fixed to the brackets 14 through means of a pair of spring-loaded pins 40 respectively forming part of a pair of pin assemblies 42 fixed to inner surfaces of the pair of circular plates. A lever 43 is fixed to one end of the rod 34 for aiding in aligning the apertures in the brackets 14 and plates 32 for reception of the pins 40.

Figure 4:
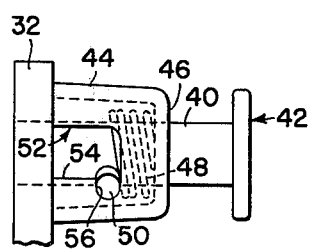
FIG. 4 is a view showing one of the spring loaded pins carried by the draft frame.

As can best be seen in FIG. 4, each pin assembly 42 includes a housing 44 having one of the pins 40 projecting through an inner wall 46 thereof and biased in the direction of the associated circular plate 32 through means of a coil compression spring 48 acting between the wall 46 and a projection 50 that is fixed to the pin 40 and extends into an L-shaped notch 52 formed in the housing 44. The notch 52 includes a first leg 54 which extends parallel to the length of the pin 40 and a second leg 56 which extends crosswise to the length of the pin 40, the leg 54 extending between the associated plate 32 and the leg 56 whereby the pin 40 may be locked in a retracted position, such as that in FIG. 4, by first pulling on the pin 40 to move the projection 50 along the leg 54 of the notch 52 and then by rotating the pin 40 to move the projection 50 in to the leg 56 of the notch 52.

In operation, once the implement 16 is positioned beneath the tractor 10 for attachment to the latter, the draft frame 24 is connected to the brackets 22 of the implement 16 by inserting the J-shaped pins 28 through the holes provided in the brackets 22 and the rear ends of the draft links 26. The pins 28 then establish a pivot axis about which the frame 24 may be swung vertically the extent necessary for disposing the transverse rod 34 just forwardly of the receptacles 38 whereupon the draft frame 24 is pushed rearwardly to dispose the rod 34 in the receptacles.

Figure 3:
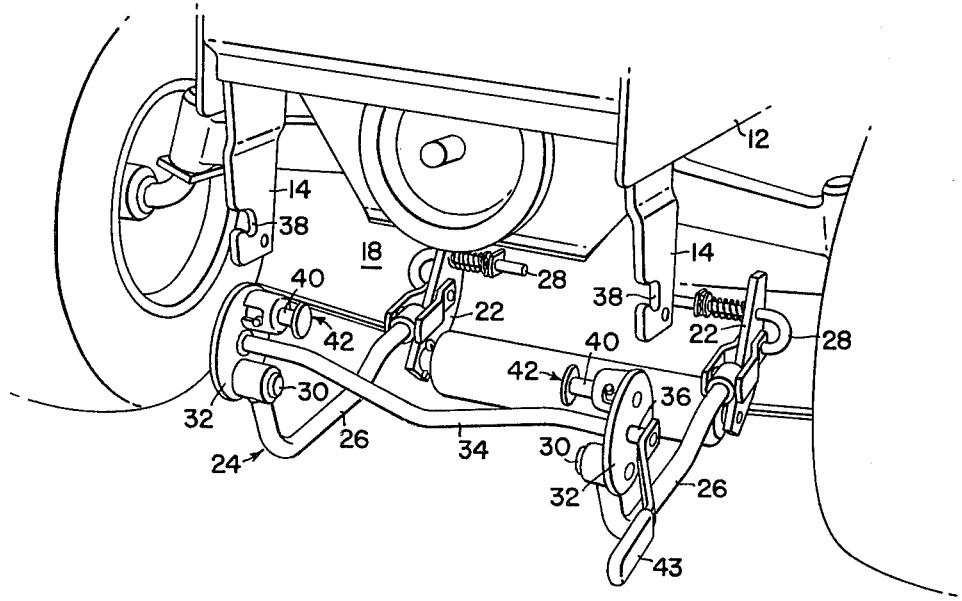
FIG. 3 is a perspective view similar to FIG. 2 but showing the draft frame disconnected from the mounting brackets.

All of this time, the pins 40 will have been in retracted positions, as shown in FIG. 3, and the draft frame 24 is then fixed to the brackets 14 by releasing the pins 40 and using the lever 43 to rotate the rod 34 in the receptacles 38 to bring the aperatures in the plates 32 into alignment with those in the brackets 14 whereupon the springs 48 acting on the pins 40 will move the latter into the aligned aperatures.

The above procedure is reversed when disconnecting the draft frame 24 from the tractor 10.

I claim:

1. In an implement and tractor combination of a type including a draft frame connected between first and second mounting brackets respectively provided at a forward underside portion of the tractor and at a forward portion of the implement, the improvement comprising: said draft frame including a connection member and a fore-and-aft draft arm means having forward and rearward ends respectively pivotally connected to the connection member and the second mounting bracket; releasable fastener means fixing said connection member to said first mounting bracket in a working position holding the forward end of said draft arm means in an elevated position; one of said first mounting bracket and connection member including receptacle means and the other of said first mounting bracket and connection member including pin means received in and cooperating with the receptacle means for permitting pivotal movement of the connection member between said working position and a non-working position when the releasable means is released, wherein the forward end of said draft arm is in a lowered position; and operating means fixed to said connection member for pivoting it between said working and non-working positions.

2. The implement and tractor combination as defined in claim 1 wherein said first mounting bracket means includes a first pair of transversely spaced vertical plates respectively defining forwardly opening jaws forming said receptacle means; and said connection member including a rod extending between said plates and having opposite ends, defining said pin means, received in said jaws.

3. The implement and tractor combination as defined in claim 2 wherein a second pair of vertical plates are fixed to said rod at spaced locations wherein the second pair of vertical plates are respectively in adjacent side-by-side relationship to said first pair of vertical plates; and said releasable fastener means including a spring-loaded pin means carried by each of said second pair of vertical plates.

4. The implement and tractor combination as defined in claim 1 wherein said connection member includes a transverse rod defining said pin means and said operating means including a lever fixed to said transverse rod.

5. In an implement and tractor combination of a type including a draft frame connected between first and second mounting brackets respectively provided at a forward underside portion of the tractor and at a forward portion of an implement, the improvement comprising: said draft frame including a transverse rod having a first pair of vertical plates fixed thereto adjacent opposite ends thereof; a pair of fore-and-aft extending draft arms having forward ends respectively pivotally connected to said pair of vertical plates at respective first locations to one side of the rod; a pair of releasable latch means respectively mounted on said pair of vertical plates at respective second locations; said first mounting bracket including a pair of receptacles receiving opposite ends of said rod such as to support said rod and first pair of vertical plates for rotation when the pair of releasable latch means are released; said first bracket further including a pair of connection means respectively cooperating with said pair of releasable latch means for fixing the rod and first pair of vertical plates in a working position when the rod and first pair of vertical plates are in a preselected angular position.

6. The implement and tractor combination defined in claim 5 wherein the pair of draft arms each include upwardly turned forward end portions.

* * * * *